(12) United States Patent
Elvanoglu et al.

(10) Patent No.: US 7,836,449 B2
(45) Date of Patent: Nov. 16, 2010

(54) EXTENSIBLE INFRASTRUCTURE FOR TASK DISPLAY AND LAUNCH

(75) Inventors: Ferhan Elvanoglu, Redmond, WA (US); Jin Feng, Redmond, WA (US); Nirav A. Kamdar, Redmond, WA (US); Yong Zhao, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1408 days.

(21) Appl. No.: 11/117,805

(22) Filed: Apr. 29, 2005

(65) Prior Publication Data

US 2006/0253854 A1    Nov. 9, 2006

(51) Int. Cl.
G06F 9/46 (2006.01)
G09G 5/00 (2006.01)

(52) U.S. Cl. .................. 718/100; 718/101; 345/619
(58) Field of Classification Search ............... 718/1–108
See application file for complete search history.

(56) References Cited

U.S. PATENT DOCUMENTS

| | | | |
|---|---|---|---|
| 6,678,889 B1* | 1/2004 | Burkett et al. ............... | 718/104 |
| 7,013,284 B2* | 3/2006 | Guyan et al. .................. | 705/9 |
| 7,177,899 B2* | 2/2007 | Ishibashi et al. ............ | 709/201 |
| 7,444,633 B2* | 10/2008 | Bohn et al. .................. | 718/100 |
| 2002/0054142 A1* | 5/2002 | Williams et al. ............ | 345/804 |
| 2002/0149615 A1* | 10/2002 | Rajarajan et al. ............ | 345/738 |
| 2003/0188299 A1* | 10/2003 | Broughton et al. .......... | 717/141 |
| 2003/0233372 A1* | 12/2003 | Warner et al. ............. | 707/104.1 |
| 2004/0230977 A1* | 11/2004 | Kraiss et al. ................ | 718/100 |

OTHER PUBLICATIONS

Wyssocky, Lidor "The Configuration Software Service" Sharp Development, Copyright 2002-2003.*

* cited by examiner

*Primary Examiner*—Emerson C Puente
*Assistant Examiner*—Willy W Huaracha
(74) *Attorney, Agent, or Firm*—Perkins Coie LLP

(57) ABSTRACT

A task infrastructure that allows for the decoupling of the task launch code from the task client code and from the task execution code is provided. The task infrastructure allows the relationship between the task display and launch logic and the task client logic to be defined in a declarative manner, allowing for the segregation of the task display and launch logic from the task client logic. The task infrastructure comprises a manifest that contains a specification of the relationship between the task display and launch logic and the task client logic. The manifest may also define which task clients expose which tasks, the context under which each task is displayed, the arguments that the task needs in order to start execution, the task description to display, and the method in which the task can be launched. At run-time, a task client can read the manifest and decide which task or tasks to expose to an end user under a current context.

11 Claims, 5 Drawing Sheets

```xml
<?xml version="1.0" encoding="utf-8" ?>
<taskTable>

<task id="Domain.PrepareDomain" handler="Microsoft.LC.TaskHander.1.5" supportsQueryStatus="true">

.
  .
  .

</task>

<task id="Server.ActivateServer" handler="Microsoft.LC.TaskHander.1.5" supportsQueryStatus="true">
  <displayName> Activate Server </displayName>
  <description>
    Activates a server after installation. Server activation must be done before a server can be used.
  </description>
  <taskClients>
    <taskClient name="Cmd" argumentCollectionMode="nonUI" method="CommandLine" />
    <taskClient name="MMC" argumentCollectionMode="UI" icon="ActivateServer.bmp" />
  </taskClients>

<contexts>
    <context> LcServerNode </context>
  </contexts>

<arguments>
    <argument name="Backend" type="string" maxLength="16"> SQL Backend server name </argument>
  </arguments>
</task>

<task id="Server.SetInitialConfiguration" handler="Microsoft.LC.TaskHander.1.5"
      supportsQueryStatus="true">

.
  .
  .

</task>

</taskTable>
```

Labels: 402 (task id), 404 (id value), 406 (handler), 408 (supportsQueryStatus), 410 (displayName), 412 (description), 414 (taskClients), 416 (taskClient), 418 (name), 420 (argumentCollectionMode), 422 (method), 424 (icon), 426 (contexts), 428 (context), 430 (arguments)

FIG. 4

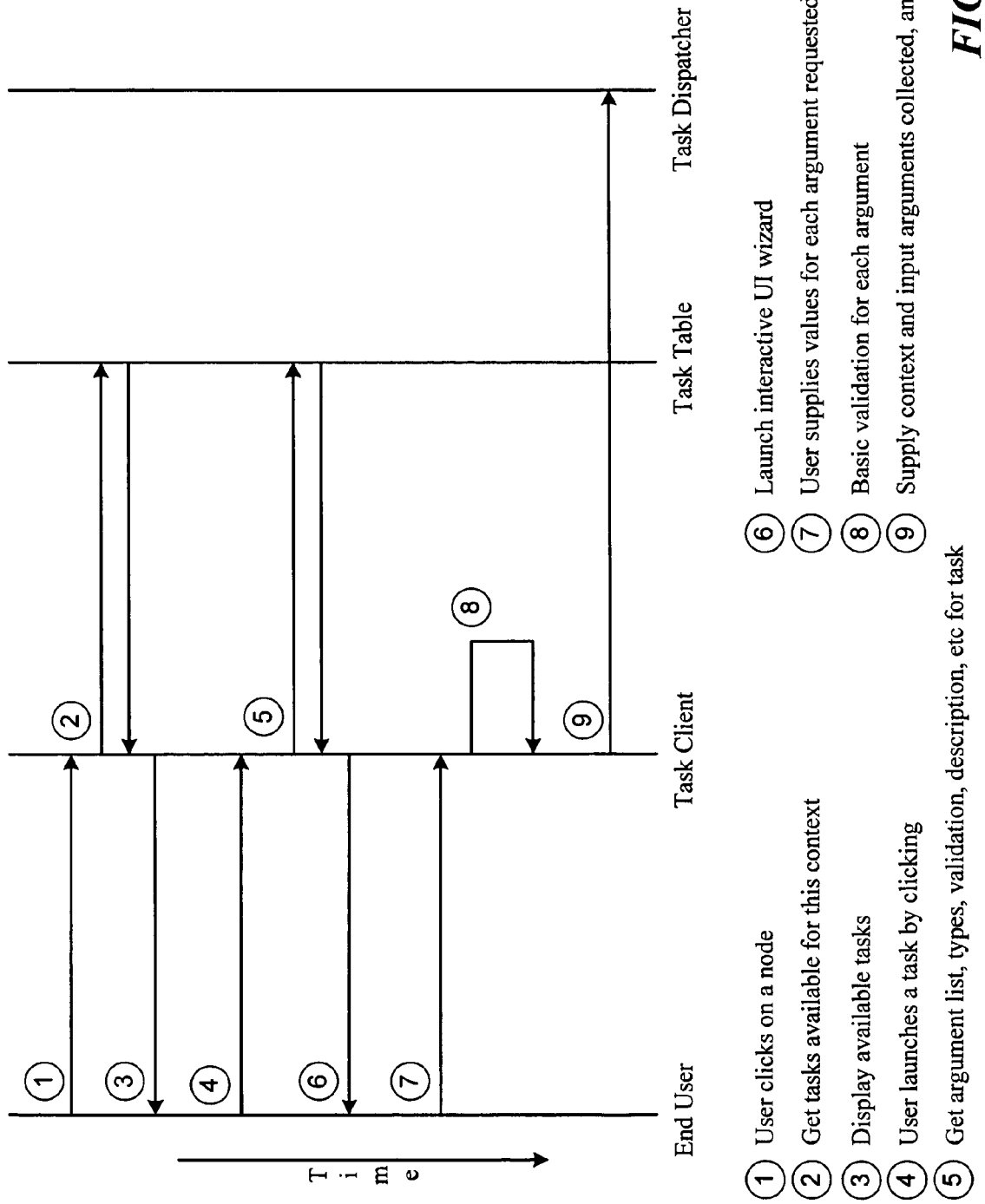

EXTENSIBLE INFRASTRUCTURE FOR TASK DISPLAY AND LAUNCH

TECHNICAL FIELD

The described technology is directed generally to application programming and, more particularly, to techniques for decoupling functionality from application programs.

BACKGROUND

Many client and server software products have a set of activities, called tasks, which are typically performed by administrators in order to install, manage and maintain the products. Examples of server tasks include setup tasks (e.g., activities performed to install a product), management tasks (e.g., activities performed to configure a product), monitoring/logging/eventing tasks (e.g., activities performed during the regular operation of the product), and maintenance/upgrade/repair task (e.g., activities performed while maintaining the product).

These server tasks are typically exposed from various clients. For example, a setup module may display or expose the setup tasks, a management console may display the management tasks, a monitoring application may display the monitoring/logging tasks, etc. Each of these applications, also referred to as task clients (or clients or task applications), requires knowledge of the tasks the application is to expose, how the application is to collect or receive the input arguments for these tasks, how the application is to launch these tasks, etc. In order for an application to display a task, the requisite knowledge of the task needs to be built—i.e., programmed or coded—into the application, typically before the launch of the product.

A drawback to this conventional approach of displaying tasks by task clients is that the knowledge of the tasks needs to be built into the task clients. In order to for an existing task client to display a newly developed task, new code needs to be written into the task client. Similarly, the conventional approach of embedding the knowledge of the tasks into the task clients does not provide an extensible mechanism for third party task developers who write tasks to integrate their tasks into the same task clients that expose the product tasks—i.e., the task clients provided with the product. Another drawback to the conventional approach is that a task is tied to a particular task client. In order for an additional task client to also display the same task, the task launch code needs to be re-written and incorporated into the additional task client.

Another drawback to the conventional approach is that since the knowledge of which tasks to expose from which task clients is embedded deep within the product, the exposure of the tasks from the task clients cannot be changed once the product is developed. For example, a product's management console may expose a configuration task that helps an administrator set the initial configuration right after product installation. If the administrator subsequently decides that the configuration task is no longer useful in his enterprise, for example, because it has been a year since the product was installed and configured and it has been working flawlessly since then, there is no way for the administrator to remove that task from the management console.

Moreover, the code that implements the tasks is typically shipped with the product and is tightly coupled to the product code and logic. Making any changes to the task code requires re-compiling, re-packaging, and re-shipping the entire module or product code. For example, a setup task that prepares a machine, such as a computer system, by creating accounts and file directories to make the machine suitable for product installation, may be written and shipped in a setup module of a product before the product is shipped. If a change needs to be made to the setup task, for example, to create an extra account, the entire setup module would have to be re-compiled and re-shipped.

Another drawback to the traditional approach of tightly coupling the task code and the product code is that it does not allow third party task developers to write tasks and integrate them into the existing modules of a product. For example, if a third party partner decides to write an extension—i.e., a third party task—to a product, they would have to provide their own system for installing, managing, maintaining and monitoring this extension. As a result, an administrator of the product will not have an integrated experience for setting-up/managing the product and for setting-up/managing the third party extension.

It would be desirable to have a technique that allows for specifying task display and launch sequences in a manner that decouples the task launch code from the task client code. It will also be desirable to have a technique that provides for rapid task deployment into existing task clients.

BRIEF DESCRIPTION OF THE DRAWINGS

FIG. 4 illustrates an XML snippet that defines an example task table, according to some embodiments.

FIG. 5 is a diagram illustrating the interactions between an end user, the task client, the task table and the task dispatcher, according to some embodiments.

DETAILED DESCRIPTION

Figure 1:
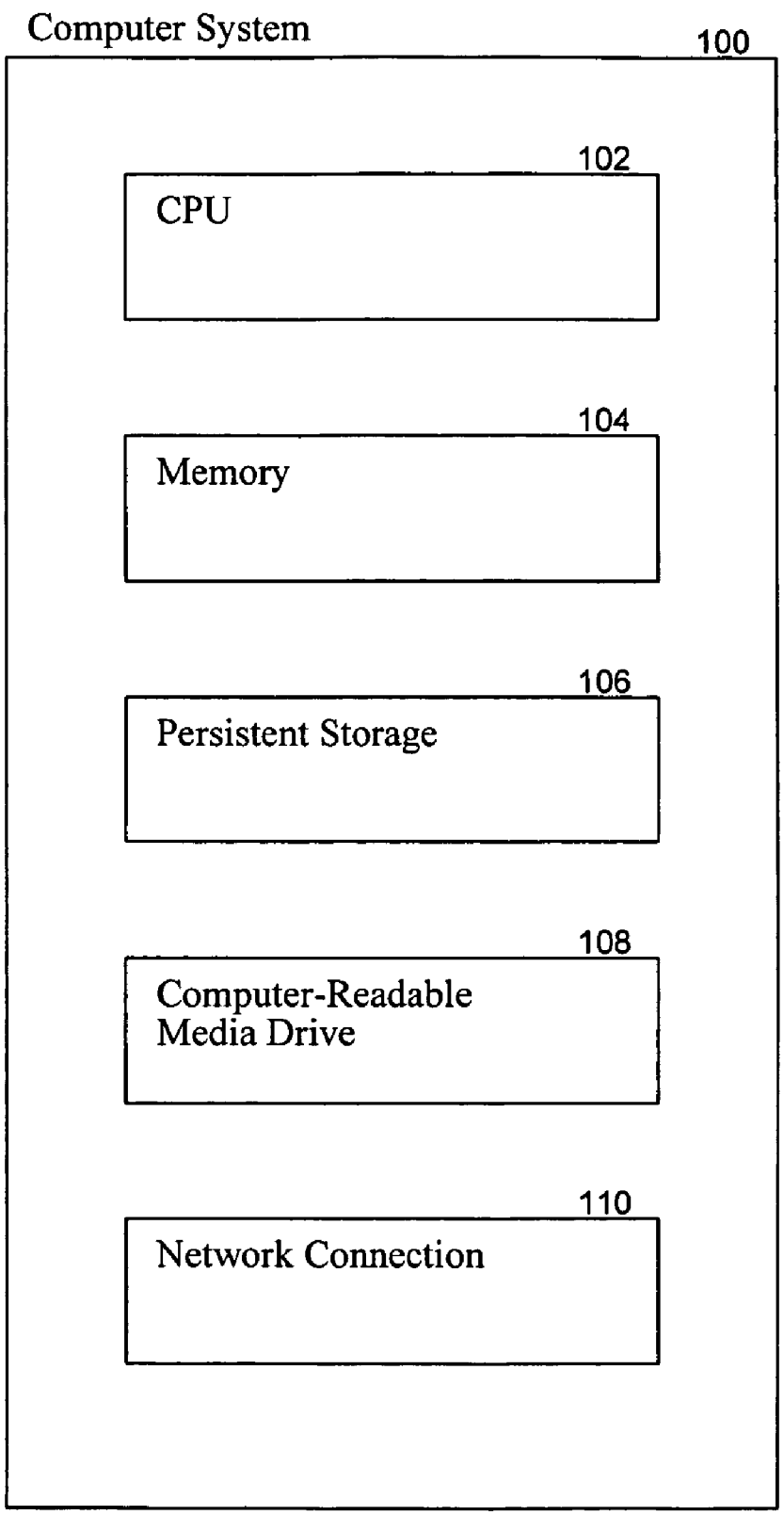
FIG. 1 is a block diagram illustrating selected components typically incorporated in at least some of the computer systems on which various embodiments of the task infrastructure and its components may be implemented.

Various techniques for decoupling the task launch code from the task client code are provided. A task infrastructure allows the relationship between the task display and launch logic and the task client logic to be defined in a declarative manner, allowing for the segregation of task display and launch from the task client logic and the task execution logic. In some embodiments, the task display and launch logic and the task client logic relationship may be specified in a declarative manifest using a markup language, such as XML. The manifest defines, among other things, which task clients expose which tasks, the context under which each task is displayed, the arguments that the task needs in order to start execution, the task description to display, the method in which the task can be launched, which module (e.g., task handler) implements which task. As used herein, the term "context" generally refers to the target of the task. For example, a setup task is performed on a context, such as a forest, domain, machine, user, etc.

The manifest may be developed—i.e., written—by product developers and shipped with a product. At run-time, a task client of the product reads the manifest and decides which task or tasks to expose to an end user under a current context. For example, a pane in the product's console, for example, the left pane, may contain a tree structure that lists the available contexts, such as the various directory forests, domains contained in each forest, pools of servers in each domain, users that belong to each server, etc. Another pane in the console, for example, the right pane, may expose the task or tasks that are available for a particular context to an end user. When the user clicks on a context in the left pane of the console, the task client—e.g., the console code in this case—reads the manifest and decides which tasks to expose in the user's current context or selection—i.e., the currently selected context. The client code retrieves the task names and their descriptions from the manifest and displays the appropriate tasks in the right pane. Thus, the modules consuming the tasks—e.g., the task clients—have no built-in knowledge of what tasks to display and, moreover, need not have any knowledge of what tasks they need to expose until the moment when actually reading the manifest to process a user's selection of a context. The manifest also enables multiple modules to expose the same set of tasks without any additional coding or logic. The manifest further enables third party task developers, end users who want to write their own tasks, and product developers who want to expose new tasks after product launch to hook the new tasks into existing task clients by modifying the manifest.

In some embodiments, the manifest allows for the specification of task handlers that serve the tasks, thus providing a mechanism for decoupling the task execution code from the core product code. For example, when a task that is exposed in the right pane is selected by the user, for example, by clicking on the task name, the task client reads the manifest to determine the arguments that are needed by the task, collects the arguments, and passes the collected arguments along with the task context to a component for launching of the selected task. The component reads the manifest, may perform some basic validation on the arguments, and determines the task handler that serves the selected task. The component then invokes that task handler and requests the task handler to execute the given task. Thus, the manifest enables the addition of new tasks or modification of existing tasks to be easy and de-coupled from the product development.

The various embodiments of the task infrastructure and its advantages are best understood by referring to FIGS. 1-5 of the drawings. The elements of the drawings are not necessarily to scale, emphasis instead being placed upon clearly illustrating the principles of the invention. Throughout the drawings, like numerals are used for like and corresponding parts of the various drawings.

FIG. 1 is a block diagram illustrating selected components typically incorporated in at least some of the computer systems on which various embodiments of the task infrastructure and its components may be implemented. These computer systems 100 may include one or more central processing units ("CPUs") 102 for executing computer programs; a computer memory 104 for storing programs and data-including data structures—while they are being used; a persistent storage device 106, such as a hard drive, for persistently storing programs and data; a computer-readable media drive 108, such as a CD-ROM drive, for reading programs and data stored on a computer-readable medium; and a network connection 110 for connecting the computer system to other computer systems, such as via the Internet, to exchange programs and/or data-including data structures. It will be appreciated that computer systems 100 may include one or more display devices for displaying program output, such as video monitors or LCD panels, and one or more input devices for receiving user input, such as keyboards, microphones, or pointing devices such as a mouse.

Embodiments of the task infrastructure and its components may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The task infrastructure may be described in the general context of computer-readable instructions, such as program modules, executed by computer systems 100 or other devices. Generally, program modules include routines, programs, objects, components, data structures, etc. that perform particular tasks or implement particular abstract data types. Memory 104 and persistent storage device 106 are computer-readable media that may contain instructions that implement the facility. It will be appreciated that memory 104 and persistent storage 106 may have various other contents in addition to the instructions that implement the screen resolution gathering and reporting system.

Figure 2:
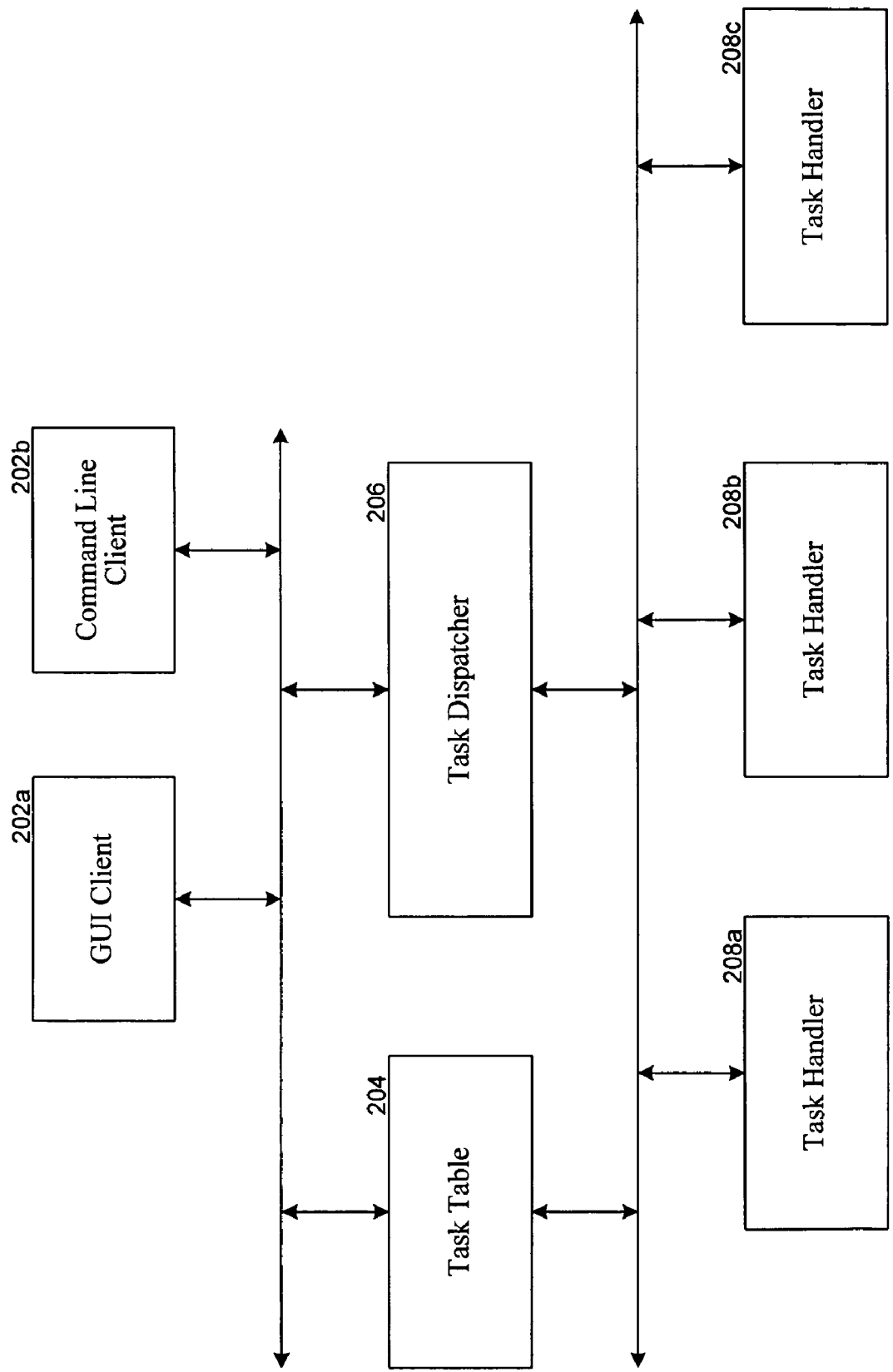
FIG. 2 is a block diagram illustrating selected components of the task infrastructure, according to some embodiments.

FIG. 2 is a block diagram illustrating selected components of the task infrastructure, according to some embodiments. The task infrastructure comprises task clients 202a and 202b, a task table 204, a task dispatcher 206, and task handlers 208a, 208b and 208c. The task clients are coupled to the task table and the task dispatcher, the task table is coupled to the task dispatcher, and both the task table and the task dispatcher are coupled to each of the task handlers. Only two task clients and three task handlers are shown in FIG. 2 for simplicity and one skilled in the art will appreciate that there may be a different number of task clients and/or task handlers in the task infrastructure.

The task client is a module that exposes the task or tasks to the end user. Examples of task clients include product setup modules or utilities, product consoles, command-line utilities, distributed common object model (DCOM) clients, such as VB scripts as well as other scripts, etc., and are typically provided with a product. As depicted in FIG. 2, task client 202a is a graphical user interface (GUI) task client, and task client 202b is a command line interface task client.

The task table defines the tasks and the context in which the tasks should be exposed to the end user. The task table may also define the relationship between the tasks and the task handlers. In some embodiments, the task table is implemented as an XML manifest that stores information, such as, the task name, description, unique ID, the task handler that implements this task, whether the task has a UI mode or not, the input argument list, the context in which the task is executed, etc., about each task.

The task dispatcher is a module that manages the various task handlers and exposes the tasks to the task clients. The task dispatcher decouples the task client from the task handler. The task dispatcher coordinates the task execution and provides common task functionalities that the task handlers can utilize without having to re-implement the common task functionalities.

In some embodiments, the task dispatcher includes an argument collection module (not depicted) for collecting input arguments from the end user that are needed in order to start task execution. These input arguments serve as a contract between the task client and the task dispatcher. Each task client can use the argument collection module to collect the input arguments since the argument collection module does not need to have any knowledge of the task client in which it resides.

In some embodiments, the argument collection module works in two modes: UI mode and non-UI mode. The task table may define the mode of the argument collection module for each task for each task client. For example, a task may be exposed by two task clients—e.g. management console and command-line setup console—that collect arguments for the same task in different modes—e.g. when the task is launched from the management console, it is executed in the UI mode, but when the same task is launched from the command line console, it is launched in the non-UI mode. For UI clients—i.e., in the UI mode—the input arguments may be collected via a "bulk" interactive wizard implemented by the argument collection module. The bulk wizard reads the argument names, description, type and basic validation rules (e.g. a string no longer than 15 characters, etc.) from the task table and constructs a wizard page or pages at run-time that collect this information and provides some basic type validation based on the validation rules. For more complicated validation, the wizard may invoke a callback function or functions in the task handler to perform the validation. For non-UI clients—i.e., in the non-UI mode—the input arguments may be collected via, for example, an input XML file or files, command-line arguments, an interactive command-line Q&A session, etc. The task table may define the method by which the input arguments are to be collected (e.g. command line, input file, Q&A, etc).

In operation, the argument collection module looks up the task table and determines which input arguments are required for a particular task. The argument collection module then collects and parses the arguments via the manner specified in the task table. For example, if the argument collection module needs to collect arguments through an input XML file, the method to parse this input file or command-line arguments may be defined by the task table. Similarly, if the argument collection module needs to collect arguments by asking questions to the end user, it may generate these questions from, for example, the "description" field in the task table for each argument.

A task handler is a module that contains the logic that implements one or more tasks. The task handler may be implemented by the product developer or someone other than the product developer, such as a third party developer. For example, as depicted in FIG. 2, task handler 208a may implement common setup tasks such as, preparing a directory, preparing a machine for installation, actual product installation, etc., for a product. Similarly, task handler 208b may implement common administration tasks such as, configuring a server, obtaining certificates for the server, managing users, etc., and task handler 208c may be a maintenance task handler that implements tasks such as, backing up and restoring server configuration, upgrading the server, etc.

In some embodiments, the task dispatcher and task handlers may communicate with each other through an interface, such as a DCOM interface. Each task handler is required to implement an interface that will allow the task dispatcher to call the task handler. This interface is the contract between the task dispatcher and the task handler, and allows the task dispatcher to call the task handler using the interface.

In some embodiments, the task dispatcher may provide a callback, also known as a sink, on which the task handlers can provide status/logs back to the task dispatcher. For example, while executing, a task handler may provide logging information to the task dispatcher via the sink interface. The logs may be more detailed than the reports that indicate the success or failure of a task handler. The logs may contain information such as, each action that a sub-task performed and whether any failed, the reason for failure, relevant error codes, suggestions, etc. The task handler may provide the logging information in a format such as XML.

In some embodiments, the task client may implement a callback on which the task dispatcher can report the status, for example, received from the task handlers, back to the task client. For example, while a task is being executed, the task handler may provide the task dispatcher status such as, "task execution started", "performing sub-task A", "performing sub-task B", "task execution completed," etc. The task dispatcher sends the task client the received status, for example, in the received XML format, via the task client's sink interface. The task client can display the received status messages as feedback strings to the end user. For example, the task client can format the XML by applying XSLT into html, or some other useful format, and display it to the end user.

In the discussion that follows, various embodiments of the task infrastructure are further described in conjunction with a variety of illustrative examples. It will be appreciated that the embodiments of the task infrastructure may be used in circumstances that diverge significantly from these examples in various respects.

Figure 3:
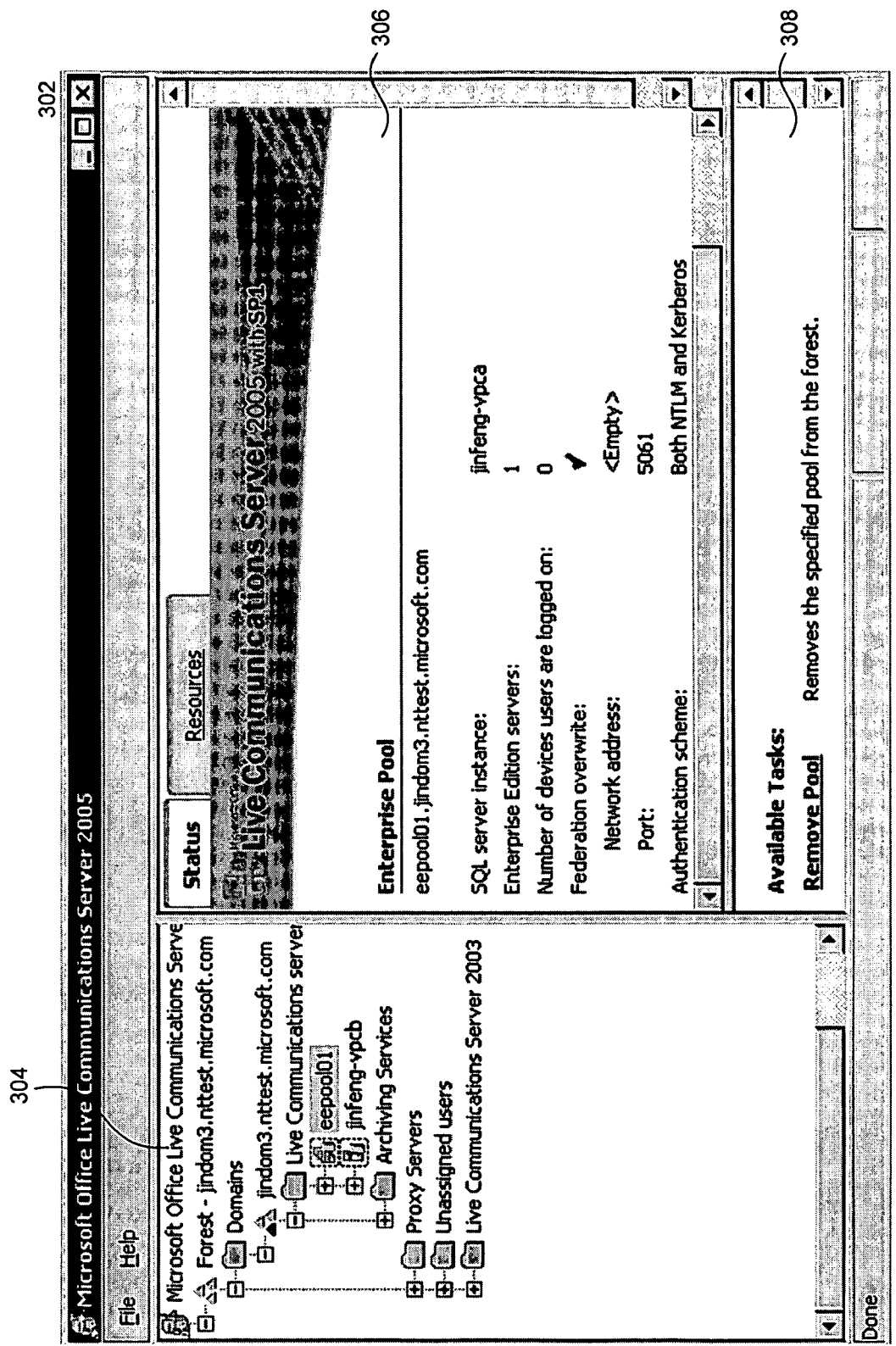
FIG. 3 illustrates an example UI of a task client.

FIG. 3 illustrates an example UI of a task client. As depicted, UI 302 comprises a scope pane 304, a result pane 306, and a task pane 308. By way of example, the UI may be a management console provided by a product, and the scope pane in the UI may contain directory hierarchy of all the forests, the domains in each forest, the servers in each domain, the users in each server, etc. The result pane may contain UI elements or sets of UI elements associated with a particular context selected in the scope pane. The task pane may expose all the tasks associated with the particular context selected in the scope pane and which are available to an end user. For example, when the end-user clicks on a context, such as a domain node, in the scope pane, the task client—i.e., console—code displays in the task pane all tasks that are relevant in the user's current context or selection. The user can then launch a desired task contained in the task pane by, for example, clicking on the task's name.

FIG. 4 illustrates an XML snippet that defines an example task table, according to some embodiments. The example task table of FIG. 4 defines three tasks "PrepareDomain," "ActivateServer," and "SetInitialConfiguration." Tag 402 contains metadata about a task that is being defined in the task table. Attribute 404 is a string attribute and contains a name that identifies the particular task that is being defined. Attribute 406 is a string attribute and contains a name of a task handler that implements the functionality of the defined task. Attribute 408 is a Boolean attribute and, when present, indicates whether or not a task client may query the named method, "QueryStatus," in order to determine whether the defined task is still applicable or no longer applicable. This mechanism enables conditional displaying of a task. For a given context, displaying a task may make sense only if that task has not already been executed. For example, if a domain is already prepared, there is no point displaying the "PrepareDomain" task. In order to support this scenario, the task dispatcher supports a "QueryStatus" method for each task. Before displaying a task, the task client can call the method "QueryStatus" on the task dispatcher. In response, the task dispatcher looks up the task table to determine whether the task handler exposes a "QueryStatus" for that task. For certain tasks, it may not make sense to have a "QueryStatus"—e.g., "AddNewServerToDomain". If the task handler exposes a "QueryStatus" for the task, the task dispatcher invokes "QueryStatus" on the task handler for that task. The result (e.g., done/partially done/not done) is returned back to the task client, and the task client can then decide whether to expose this task to the end user.

Tag 410 contains a visually-friendly name of the defined task. For example, the visually-friendly name may be displayed to the end user, used in logs to identify the task, etc. Tag 412, when present, contains a description of the functionality of the defined task. Tag 414 contains a list of client environments—i.e., task clients—that support or expose the defined task. Tag 416 contains metadata about a task client that supports the defined task. Attribute 418 is a string attribute and contains a name that identifies a task client. This string attribute may contain a name, such as, by way of example, "Cmd," which indicates that the identified task client is a command line client. Attribute 420 is a string attribute and contains an indication of whether or not the identified task client will show a GUI. For example, if this attribute contains the string "nonUI," then the identified task client will not display a GUI to obtain the input arguments that are needed to execute the defined task. Conversely, if this attribute contains the string "UI," then the identified task client will display a GUI to obtain the input arguments. Attribute 422, when present, is a string attribute and indicates the format of the input arguments. Attribute 424, when present, is a string attribute and contains a name of an icon that is to be associated with the defined task. For example, the named icon can be used in the UI clients—e.g., in the task pane of the product console—when displaying the defined task.

Tag 426 contains a list of applicable contexts for the defined task. Tag 428 contains a name of an applicable context for the defined task. Tag 430, when present, contains a list of arguments that are expected by the defined task. For each argument, this tag may contain an attribute that specifies the type of the argument and basic validation rules for validating the argument. This tag may contain a name of a function for validating the argument.

By way of example, a product may ship with two default tasks in the server context, "SetInitialConfiguration" and "ActivateServer," which are to be displayed from the product's GUI console, and a default task in the domain context, "PrepareDomain," which is to be displayed from the product's command line console. Subsequently, a third party task provider can write a new task called "RevertToSafeConfiguration" that rolls back the configuration of the product to a known, safe configuration, and use the provided task table and the task infrastructure to seamlessly integrate the new task into the product. Similarly, a system administrator of an enterprise that is using the product may decide that "SetInitialConfiguration" is no longer relevant and may remove it from the task table, or change the task client from MMC to a less used command line console. The system administrator may also decide that "ActivateServer" is to also be exposed by a command line console and add the command line console in the task table.

A technical advantage provided by the task infrastructure is the ease with which new tasks may be added to a product. For example, if a new task needs to be added after the launch of a product, the new task can simply be added to the task clients by modifying the task table that ships with the product. Another technical advantage provided by the task infrastructure is that both the new and the old tasks utilize the same entry points and the same UI experience since they are implemented by the same modules. Moreover, the end user has control over which tasks are exposed from which tasks clients. The end user can remove tasks that the end user deems unimportant by removing them from the task table. The end user can expose tasks that the end user writes, and that may have meaning only in the user's enterprise, from the same task clients that are provided with the product.

FIG. 5 is a diagram illustrating the interactions between an end user, the task client, the task table and the task dispatcher, according to some embodiments. By way of example, the user may be an administrator of an enterprise who is viewing a product console similar to that illustrated in FIG. 3. The left pane of the product console may display a hierarchy of nodes—e.g., a hierarchy of all the forests, the domains in each forest, the servers in each domain, the users in each server, etc. In stage 1, the user clicks on a desired node contained in the left pane of the product console. In response, the task client—i.e., the console code—retrieves from the task table all of the tasks that are available for the user specified context—i.e., the desired node contained in the left pane of the product console—in stage 2. In stage 3, the task client displays, for example, in another pane on the console, the tasks that are available for the desired node to the user. In stage 4, the user launches a desired task by, for example, clicking on the task name that is displayed on the console. In response, the task client, in stage 5, retrieves from the task table information regarding any arguments, types, validation, description, etc. that are needed in order to launch the desired task. In stage 6, the task client launches an interactive UI wizard that requests from the user the arguments that are required to launch the desired task. In stage 7, the user supplies values for the arguments requested by the wizard. In stage 8, the task client performs basic validation of each of the arguments received from the user. Upon validating each of the arguments, the task client, in stage 9, passes the collected arguments along with the current context information to the task dispatcher to launch the desired task. In response, the task dispatcher determines from the task table the task handler that serves the desired task, and invokes the task handler and requests the task handler to execute the desired task.

One skilled in the art will appreciate that, for this and other processes and methods disclosed herein, the functions performed in the processes and methods by one component may be performed by another, different component. For example, in various embodiments, the task dispatcher may determine from the task table information regarding any validation that needs to be performed on the arguments and may further validate the arguments. Furthermore, the outlined steps are only exemplary, and some of the steps may be optional, combined with fewer steps, or expanded into additional steps without detracting from the essence of the invention.

Even though the various embodiments of the task infrastructure are described in conjunction with a server product and a product console, the task infrastructure need not be limited only to server products and product consoles. As such, one skilled in the art will appreciate that the task infrastructure can be readily applied to client products. For example, a word processing application can expose tasks to its end user as defined by a task table. The end user can write new tasks and plug them in seamlessly in the application, and the word processing application simply reads the task table and displays these tasks as icons.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A computer-readable storage medium containing computer-executable instructions implementing a task infrastructure for decoupling task launch code from task client code, the task infrastructure comprising:

a task table that includes a task definition for each of a plurality of tasks, each task definition of a task providing information regarding a context in which the task should be exposed to an end user, arguments that the task needs to start execution, validation rules for the arguments, a task description to display, a launch method by which the task is to be launched, and an identification of a task handler with computer code that implements the task;

a task dispatcher that coordinates launching the execution of tasks task handlers using launch methods and arguments; and a task client being configured to:
  display at least one context,
  in response to the end user selecting the at least one context, determine from the task table which tasks to expose to the end user based on comparison of the end-user selected context to the context in task definitions,
  display the task description of the tasks that are to be exposed under the selected context,
  in response to the end user selecting a task that is exposed, collect from the end user via a user interface (UI) of an interactive wizard argument values for arguments that the selected task needs to start execution,
  in response to collecting from the end user the argument values, perform validation of the argument values based on the validation rules, and
  directing the task dispatcher to launch the execution of the task handler for the selected task using the launch method and the collected argument values of the selected task wherein the task client contains no built-in knowledge of what tasks to display.

2. The task infrastructure of claim 1, wherein the task table is implemented using a markup language.

3. The task infrastructure of claim 2, wherein the markup language is an extensible markup language.

4. The task infrastructure of claim 1, wherein the task table also includes information regarding which task clients are to expose the task, and further wherein the task client being operable to determine from the task table if it is to expose the tasks.

5. The task infrastructure of claim 1, wherein the task dispatcher providing a callback mechanism through which the task handlers provide status information to the task dispatcher.

6. A computer-implemented method for a task client to display and launch a task, the method comprising:
  providing a task table that includes a task definition for each of a plurality of tasks, each task definition of a task providing context indicating nodes for which the task should be exposed to an end user, arguments that the task needs to start execution, validation rules for the arguments, a task description to display when the task is exposed, and an identification of a task handler with computer code that implements the task;
  exposing a plurality of nodes;
  receiving an indication of a desired one of the plurality of nodes;
  identifying from the task table a list of tasks that should be exposed to the end user for the desired one of the plurality of nodes, the task table comprising information that defines the plurality of nodes and a list of tasks associated with each of the plurality of nodes;
  exposing the list of tasks that should be exposed to the end user for the desired one of the plurality of nodes, the exposed listing including the task descriptions of the exposed tasks as indicated by the task definitions; and
  when the end user selects an exposed task,
    collecting from the end user via a user interface (UI) of an interactive wizard argument values for arguments that the selected task needs to start execution,
    in response to collecting from the end user the argument values, performing validation of the argument values based on the validation rules, and
    launching the task handler of the selected task with the collected argument values of the selected task.

7. The method of claim 6, wherein the task table comprises information that identifies which task clients are to expose the plurality of nodes, and wherein the exposing of the list of tasks available for the desired one of the plurality of nodes is in response to determining from the task table that the task client is to expose the list of tasks available for the desired one of the plurality of nodes.

8. The method of claim 6, wherein the task table comprises information that identifies arguments that are needed in order to launch the list of tasks available for the desired one of the plurality of nodes, and further comprising:
  receiving an indication of a desired task from the list of tasks to launch;
  retrieving from the task table a list of arguments that are needed to launch the desired task; and
  requesting values for the list of arguments that are needed to launch the desired task.

9. The method of claim 6, wherein the launching further comprises:
  passing the collected argument values to the task handler; and
  informing the task handler of the desired one of the plurality of nodes; and
  requesting the task handler to execute the desired task.

10. A computer system implementing a task infrastructure for decoupling task launch code from task client code, comprising:
  a task table that includes a task definition for each of a plurality of tasks, each task definition of a task providing information regarding a context in which the task should be exposed to an end user, arguments that the task needs to start execution, validation rules for the arguments, a task description to display, a launch method by which the task is to be launched, and an identification of a task handler with computer code that implements the task;
  a memory storing computer-executable instructions of:
    a task dispatcher that coordinates launching the execution of task handlers using launch methods and arguments; and
    a task client being configured to:
      display at least one context,
      in response to the end user selecting the at least one context, determine from the task table which tasks to expose to the end user based on comparison of the end-user selected context to the context in task definitions,
      display the task description of the tasks that are to be exposed under the selected context,
      in response to the end user selecting a task that is exposed, collect from the end user via a user interface (UI) of an interactive wizard argument values for arguments that the selected task needs to start execution,
      in response to collecting from the end user the argument values, perform validation of the argument values based on the validation rules, and directing the task dispatcher to launch the execution of the task handler for the selected task using the launch method and the collected argument values of the selected task wherein the task client contains no built-in knowledge of what tasks to display; and a processor for executing the computer-executable instructions stored in the memory.

11. The computer system of claim 10, wherein the task table also includes information regarding which task clients are to expose the task, and further wherein the task client being configured to determine from the task table if it is to expose the tasks.

* * * * *